(12) United States Patent
Goyal et al.

(10) Patent No.: US 10,235,211 B2
(45) Date of Patent: Mar. 19, 2019

(54) METHOD AND APPARATUS FOR DYNAMIC VIRTUAL SYSTEM ON CHIP

(71) Applicant: Cavium, LLC, Santa Clara, CA (US)

(72) Inventors: Rajan Goyal, Saratoga, CA (US);
Muhammad Raghib Hussain, Saratoga, CA (US); Richard E. Kessler, Northborough, MA (US)

(73) Assignee: Cavium, LLC, Santa Clara, CA (US)

( * ) Notice: Subject to any disclaimer, the term of this patent is extended or adjusted under 35 U.S.C. 154(b) by 181 days.

(21) Appl. No.: 15/136,330

(22) Filed: Apr. 22, 2016

(65) Prior Publication Data

US 2017/0308408 A1 Oct. 26, 2017

(51) Int. Cl.
*G06F 9/455* (2018.01)
*G06F 9/50* (2006.01)

(52) U.S. Cl.
CPC ........ *G06F 9/5077* (2013.01); *G06F 9/45533* (2013.01)

(58) Field of Classification Search
None
See application file for complete search history.

(56) References Cited

U.S. PATENT DOCUMENTS

| 6,587,938 | B1 | 7/2003 | Eilert et al. | |
|---|---|---|---|---|
| 7,054,930 | B1* | 5/2006 | Cheriton | H04L 63/0263 370/390 |
| 8,141,156 | B1* | 3/2012 | Mao | H04L 45/021 709/223 |
| 8,543,728 | B2* | 9/2013 | Pan | H04L 45/22 370/221 |
| 8,826,271 | B2* | 9/2014 | Hussain | G06F 9/5077 718/1 |
| 9,378,033 | B2 | 6/2016 | Hussain et al. | |
| 9,424,063 | B2* | 8/2016 | Kirubanandam | G06F 9/45558 |
| 9,639,379 | B1* | 5/2017 | Suit | G06F 9/45558 |
| 9,665,300 | B2* | 5/2017 | Hussain | G06F 9/5077 |
| 9,823,868 | B2 | 11/2017 | Hussain et al. | |
| 10,146,463 | B2 | 12/2018 | Hussain et al. | |
| 2002/0010844 | A1 | 1/2002 | Noel et al. | |
| 2002/0087611 | A1 | 7/2002 | Tanaka et al. | |
| 2002/0099901 | A1 | 7/2002 | Tanaka et al. | |
| 2004/0114569 | A1* | 6/2004 | Naden | H04L 45/08 370/351 |
| 2006/0070065 | A1 | 3/2006 | Zimmer et al. | |
| 2006/0173970 | A1 | 8/2006 | Pope et al. | |
| 2007/0028244 | A1 | 2/2007 | Landis et al. | |
| 2007/0214456 | A1 | 9/2007 | Casey et al. | |
| 2007/0217409 | A1 | 9/2007 | Mann | |
| 2008/0086729 | A1 | 4/2008 | Kondoh et al. | |

(Continued)

*Primary Examiner* — Hiren P Patel
(74) *Attorney, Agent, or Firm* — Hamilton, Brook, Smith & Reynolds, P.C.

(57) ABSTRACT

A processor device comprises a plurality of virtual systems on chip, configured to utilize resources of a plurality of resources in accordance with a resource alignment between the plurality of virtual systems on chip and the plurality of resources. The processor device may further comprises a resource aligning unit configured to modify the resource alignment, dynamically, responsive to at least one event. Modifying the resource alignment, dynamically, may prevent a loss in throughput otherwise effectuated by the at least one event.

69 Claims, 6 Drawing Sheets

(56) References Cited

U.S. PATENT DOCUMENTS

| | | | |
|---|---|---|---|
| 2008/0098127 A1* | 4/2008 | Engel | H04L 45/02 709/238 |
| 2008/0133842 A1 | 6/2008 | Raikin et al. | |
| 2008/0163203 A1 | 7/2008 | Anand et al. | |
| 2009/0083263 A1 | 3/2009 | Felch et al. | |
| 2010/0017519 A1 | 1/2010 | Han et al. | |
| 2010/0268523 A1 | 10/2010 | Dhanwada et al. | |
| 2011/0029969 A1* | 2/2011 | Venkataraja | G06F 9/5077 718/1 |
| 2011/0225583 A1* | 9/2011 | Suh | G06F 9/4887 718/1 |
| 2011/0271277 A1* | 11/2011 | Hussain | G06F 9/5077 718/1 |
| 2011/0296019 A1* | 12/2011 | Ferris | G06F 9/45533 709/226 |
| 2012/0054848 A1 | 3/2012 | Salowey et al. | |
| 2012/0102135 A1* | 4/2012 | Srinivasan | G06F 9/45558 709/213 |
| 2012/0311597 A1* | 12/2012 | Manula | G06F 9/5077 718/104 |
| 2013/0024856 A1* | 1/2013 | Yusupov | G06F 9/4406 718/1 |
| 2013/0024857 A1* | 1/2013 | Yusupov | G06F 9/5077 718/1 |
| 2013/0263117 A1* | 10/2013 | Konik | G06F 9/5077 718/1 |
| 2013/0308641 A1 | 11/2013 | Ackley | |
| 2014/0007097 A1* | 1/2014 | Chin | G06F 9/45533 718/1 |
| 2014/0016650 A1* | 1/2014 | Chai | H04L 45/02 370/431 |
| 2014/0058871 A1* | 2/2014 | Marr | G06F 9/45533 705/26.1 |
| 2014/0181294 A1* | 6/2014 | Deshpande | G06F 9/45533 709/224 |
| 2014/0201374 A1* | 7/2014 | Ashwood-Smith | H04L 49/70 709/226 |
| 2014/0204734 A1* | 7/2014 | Mizuno | H04L 49/70 370/225 |
| 2014/0223233 A1* | 8/2014 | Heyrman | G06F 11/1402 714/23 |
| 2014/0359621 A1 | 12/2014 | Hussain et al. | |
| 2014/0359622 A1 | 12/2014 | Hussain et al. | |
| 2015/0254189 A1* | 9/2015 | Coppola | G06F 12/145 711/163 |
| 2015/0363216 A1* | 12/2015 | Sampathkumar | G06F 9/45558 718/1 |
| 2016/0004554 A1* | 1/2016 | Minezaki | G06F 11/20 718/1 |
| 2016/0036838 A1* | 2/2016 | Jain | H04L 63/1416 726/23 |
| 2016/0092677 A1* | 3/2016 | Patel | G06F 21/55 726/23 |
| 2016/0149771 A1* | 5/2016 | Prasad | H04L 41/5054 709/226 |
| 2016/0182684 A1* | 6/2016 | Connor | G06F 9/45558 709/203 |
| 2016/0239331 A1* | 8/2016 | Tamura | G06F 9/45558 |
| 2016/0294873 A1* | 10/2016 | Fan | H04L 63/1416 |
| 2017/0012904 A1* | 1/2017 | Matzek | H04L 67/1002 |
| 2017/0024159 A1 | 1/2017 | Hussain et al. | |
| 2017/0039084 A1* | 2/2017 | Atsmon | G06F 9/45558 |
| 2017/0161117 A1* | 6/2017 | Fukuda | G06F 9/5077 |
| 2017/0163510 A1* | 6/2017 | Arora | H04L 43/0876 |
| 2017/0177395 A1* | 6/2017 | Sun | G06F 9/45558 |
| 2017/0185450 A1* | 6/2017 | Le Bars | G06F 9/4887 |
| 2017/0223035 A1* | 8/2017 | Watanabe | H04L 63/1416 |
| 2017/0228183 A1 | 8/2017 | Hussain et al. | |
| 2018/0034733 A1* | 2/2018 | Hayashi | H04L 12/66 |

* cited by examiner

METHOD AND APPARATUS FOR DYNAMIC VIRTUAL SYSTEM ON CHIP

BACKGROUND

A virtual machine is a software implementation of a physical machine that operates similar to a physical machine. Multiple virtual machines may be implemented on a physical machine to allow for sharing of the underlying physical machine resources.

SUMMARY

According to one example embodiment, a processor device may comprise a plurality of virtual systems on chip, configured to utilize resources of a plurality of resources in accordance with a resource alignment between the plurality of virtual systems on chip and the plurality of resources. The processor device may further comprise a resource aligning unit configured to modify the resource alignment, dynamically, responsive to at least one event.

The resource aligning unit may be further configured to modify the resource alignment, dynamically, to effectuate a throughput of the processor device responsive to the at least one event.

The processor device may further comprise a configuring unit operatively coupled to the resource aligning unit and configured to apply the modified resource alignment, dynamically, responsive to at least one modification to the resource alignment.

The configuring unit may be further configured to detect that the resource aligning unit modified the resource alignment.

The configuring unit may be further configured to receive a communication from the resource aligning unit indicating that the resource aligning unit modified the resource alignment.

To apply the modified resource alignment, dynamically, the configuring unit may be further configured to update a configuration of the processor device to enforce the plurality of virtual systems on chip to utilize the resources in accordance with the modified resource alignment.

The at least one modification may include a modification to an alignment between a given virtual system on chip of the plurality of virtual systems on chip and a given resource of the plurality of resources. The configuring unit may be further configured to apply the at least one modification based on the given virtual system on chip relinquishing use of the given resource or based on expiration of a predetermined time value applied thereto.

The processor device may further comprise a monitoring unit operatively coupled to the resource aligning unit. The monitoring unit may be configured to monitor for at least one instance of the at least one event and to communicate the at least one instance of the at least one event to the resource aligning unit to trigger the resource aligning unit to modify the resource alignment, dynamically.

To monitor for the at least one instance of the at least one event, the at least one monitoring unit may be further configured to monitor a state of at least one resource of the plurality of resources or at least one virtual system state of the plurality of virtual systems on chip.

The state of the at least one resource may include a failure state, a utilization state, or a combination thereof.

The at least one virtual system state may include a failure state, a utilization state, or a combination thereof.

The resource alignment may include a plurality of mappings between the plurality of resources and the plurality of virtual systems on chip. To modify the resource alignment, dynamically, the resource aligning unit may be further configured to modify at least one mapping of the plurality of mappings, dynamically, responsive to the at least one event.

The at least one mapping may align a given resource, of the plurality of resources, with a given virtual system on chip, of the plurality of virtual systems on chip. Modifying the at least one mapping, dynamically, may include aligning the given resource with at least one other virtual system on chip of the plurality of virtual systems on chip to preclude the given virtual system from employing the given resource and to enable the at least one other virtual system to employ the given resource.

To modify the resource alignment, dynamically, the resource aligning unit may be further configured to add at least one mapping to the resource alignment, the at least one mapping aligning a resource, of the plurality of resources, with a virtual system on chip, of the plurality of virtual systems on chip.

The resource alignment may include a plurality of mappings between the plurality of resources and the plurality of virtual systems on chip, and to modify the resource alignment, dynamically, may include removing at least one mapping from the plurality of mappings.

The resource alignment may enable multiple virtual systems on chip, of the plurality of virtual systems on chip, to share a given resource, of the plurality of resources.

The multiple virtual systems on chip, of the plurality of virtual systems on chip, may each be configured to use the given resource based on a respective usage percentage allocated to the respective virtual system for the given resource.

The resource alignment may enable a given virtual system on chip, of the plurality of virtual systems on chip, to use a given resource, exclusively.

The at least one event may include an external event that transpires external to the processor device.

The at least one event may include a prescheduled event that is based on a time of day.

The at least one event may include a failure event that indicates a malfunction of a given resource of the plurality of resources.

The at least one event may include an oversubscription event indicating that at least one resource of the plurality of resources is oversubscribed or indicating that at least one virtual system on chip of the plurality of virtual systems on chip is oversubscribed.

The at least one event may include an idling event indicating that a given resource, of the plurality of resources, that is aligned to a given virtual system on chip, of the plurality of virtual systems on chip, has a usage percentage by the given virtual system that is below a threshold value.

The resource alignment may be modified, dynamically, to prevent a loss in throughput otherwise effectuated by the at least one event.

According to another example embodiment, a method may comprise configuring a plurality of virtual systems on chip of a processor device to utilize resources of a plurality of resources in accordance with a resource alignment between the plurality of virtual systems on chip and the plurality of resources. The method may further comprise modifying the resource alignment, dynamically, responsive to at least one event.

Modifying the resource alignment, dynamically, responsive to the at least one event, may effectuate a throughput of the processor device responsive to the at least one event.

The method may further comprise applying the modified resource alignment, dynamically, responsive to at least one modification to the resource alignment.

The method may further comprise detecting the at least one modification to the resource alignment.

The method may further comprise receiving a communication of the at least one modification to the resource alignment.

The method may further comprise updating a configuration of the processor device to enforce the plurality of virtual systems on chip to utilize the resources in accordance with the modified resource alignment.

The at least one modification may include a modification to an alignment between a given virtual system on chip of the plurality of virtual systems on chip and a given resource of the plurality of resources. Applying the at least one modification may be based on the given virtual system relinquishing use of the given resource or may be based on expiration of a pre-determined time value applied thereto.

The method may further comprise monitoring for at least one instance of the at least one event and communicating the at least one instance of the at least one event to trigger dynamic modification of the resource alignment.

Monitoring may include monitoring a state of at least one resource of the plurality of resources or at least one virtual system state of the plurality of virtual systems on chip.

The resource alignment may include a plurality of mappings between the plurality of resources and the plurality of virtual systems on chip, and modifying the resource alignment, dynamically, may include modifying at least one mapping of the plurality of mappings, dynamically, responsive to the at least one event.

The at least one mapping may align a given resource, of the plurality of resources, with a given virtual system on chip, of the plurality of virtual systems on chip. Modifying the at least one mapping, dynamically, may include aligning the given resource with at least one other virtual system on chip of the plurality of virtual systems on chip to preclude the given virtual system from employing the given resource and to enable the at least one other virtual system to employ the given resource.

Modifying the resource alignment, dynamically, may include adding at least one mapping to the resource alignment, the at least one mapping may align a resource, of the plurality of resources, with a virtual system on chip, of the plurality of virtual systems on chip.

The resource alignment may include a plurality of mappings between the plurality of resources and the plurality of virtual systems on chip, and modifying the resource alignment, dynamically, may include removing at least one mapping from the plurality of mappings.

The method may further comprise enabling multiple virtual systems on chip, of the plurality of virtual systems on chip, to share a given resource, of the plurality of resources based on the resource alignment.

Enabling the multiple virtual systems on chip may include configuring the multiple virtual systems on chip to use the given resource based on a respective usage percentage allocated to the respective virtual system for the given resource.

The method may further comprise enabling a given virtual system on chip, of the plurality of virtual systems on chip, to use a given resource, exclusively, based on the resource alignment.

Modifying the resource alignment, dynamically, may prevent a loss in throughput otherwise effectuated by the at least one event.

Yet another example embodiment may include a non-transitory computer-readable medium having stored thereon a sequence of instructions which, when loaded and executed by a processor, causes the processor to complete methods disclosed herein.

It should be understood that embodiments disclosed herein can be implemented in the form of a method, apparatus, system, or computer readable medium with program codes embodied thereon.

BRIEF DESCRIPTION OF THE DRAWINGS

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

DETAILED DESCRIPTION

Figure 1:
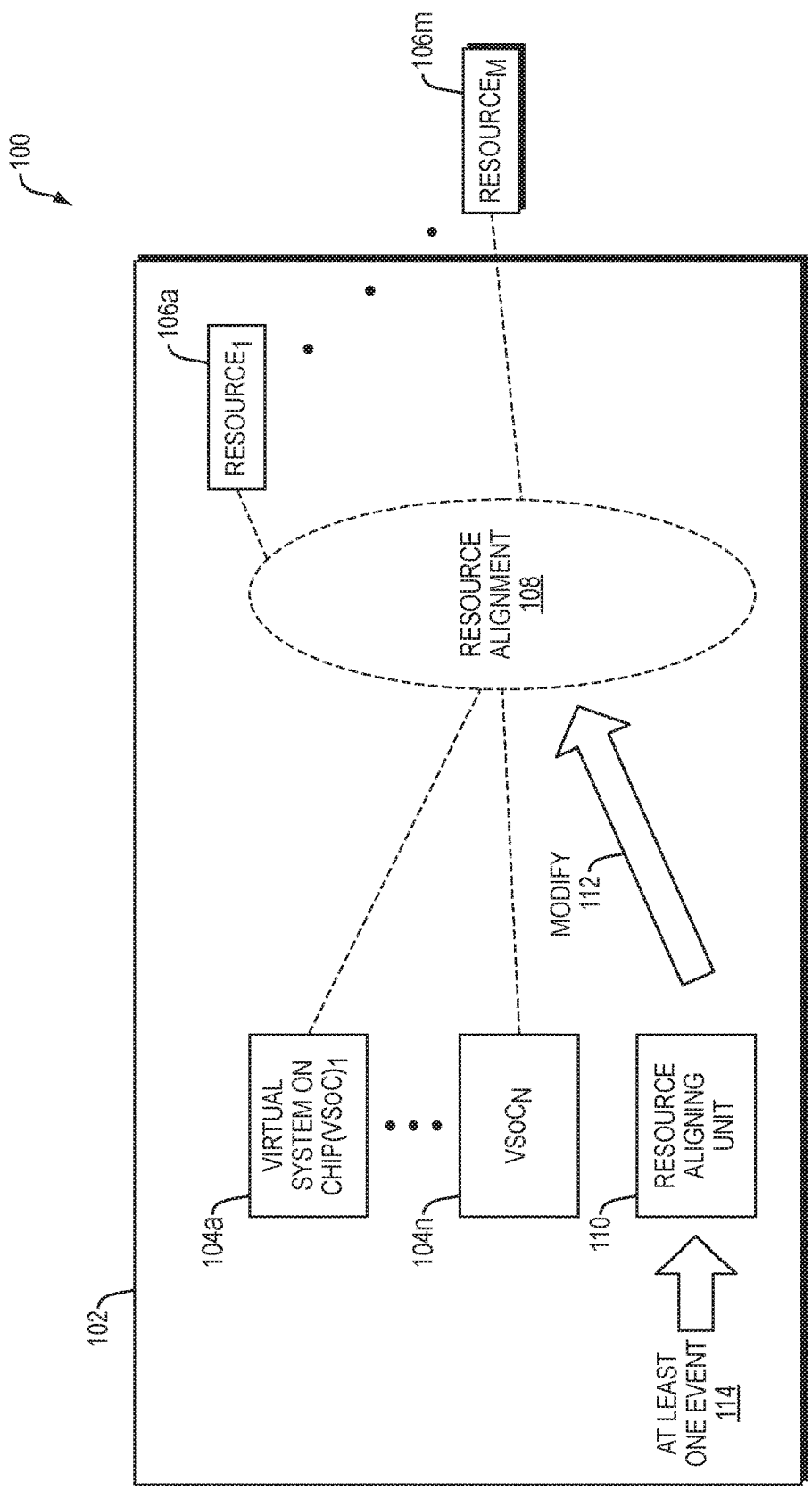
FIG. 1 is a block diagram of an example embodiment of a processor device.

A virtual system on chip (VSoC) is an implementation of a machine that allows for sharing of underlying physical machine resources between different virtual systems. Under a VSoC implementation, multiple operating system applications can co-exist on the same physical machine with complete isolation from one another and protection. Allocation of the physical machine resources amongst the different virtual systems may be performed using a combination of hardware and software features.

By allocating resources amongst multiple virtual systems on chip, embodiments disclosed herein may provide for executing multiple embedded applications and operating systems on a chip while enabling sharing of the resources with protection among the multiple virtual systems on chip.

The processor device may be used in a wide variety of networking and storage equipment, including routers, switches, security appliances, content-aware switches, triple-play gateways, aggregation devices and gateways, storage arrays, storage networking equipment, and servers, or any other suitable apparatus or system that may benefit from virtualization. According to embodiments disclosed herein, a VSoC of a processor device may utilize resources allocated to the VSoC based on a resource alignment that defines which resources are allocated for use by which VSoC of the processor device. The resources may include processing cores, memories, caches, input/output (I/O) ports, I/O devices, hardware accelerators, operating systems, software applications, or any other suitable resource that may be utilized by a VSoC.

For example, the processor device may include resources, such as application specific co-processors that offload the processing cores so that the processor device achieves high-throughput. The processing cores may be full-functionality and high-performance integer or floating point Arithmetic Logic Unit (ALU) implementations and directly support industry standard C/C++, or any other suitable programming environments. The processing cores may have all the necessary requirements to boot and run full-functionality operating systems within the virtual systems on chip.

The resources may be internal or external to the processor device. The resource alignment may include an alignment that groups resources of the processor device into subsets that correspond to the virtual systems on chip of the processor device. Some resources of the subsets may overlap, for example, a resource, such as a processing core, may be shared by multiple virtual systems on chip, as defined by the resource alignment. According to embodiments disclosed herein, the resource, such as the processing core, may be utilized by multiple different virtual systems on chip based on the resource alignment. Sharing may be based on a percentage allocated to a corresponding virtual system on chip.

Sharing of the resource may include sharing the resource based on a range allocated to the corresponding virtual system on chip. For example, while multiple virtual systems on chip may be aligned with a same resource, such as a memory, each of the virtual systems on chip may be restricted to a particular range for the memory, to provide isolation for each memory location within the memory.

Alternatively, the resource may be used exclusively by a particular VSoC, in accordance with the resource alignment. For example, some resources, such as particular types of I/O ports, may not be shared.

The resource alignment may be modified, dynamically, and may be referred to interchangeably herein as a dynamic resource alignment, a resource assignment, or a dynamic resource assignment. According to embodiments disclosed herein, the resource alignment may define how resources of the processor device are partitioned amongst a plurality of virtual systems on chip. The resource alignment may be created prior to runtime or, alternatively, created during runtime. The resource alignment may be modified, dynamically, during runtime, based on at least one event. The resource alignment may be modified, dynamically, during runtime, based on a timer, metrics that are monitored, or an external event. For example, the at least one event may be based on a timer that indicates time of day. The at least one event may be based on metrics, such as runtime usage metrics, fault metrics, Quality of Service (QoS) metrics, high or low watermarks, or any other suitable metrics.

FIG. 1 is a block diagram 100 of an example embodiment of a processor device 102. The processor device 102 comprises a plurality of virtual systems on chip 104a-n. The plurality of virtual systems on chip 104a-n may be configured to utilize resources of a plurality of resources 106a-m in accordance with a resource alignment 108 between the plurality of virtual systems on chip 104a-n and the plurality of resources 106a-m. The resource alignment 108 may define which resources of the plurality of resources 106a-m are allocated to which virtual systems on chip of the plurality of virtual systems on chip 104a-n. The processor device 102 further comprises a resource aligning unit 110 configured to modify 112 the resource alignment 108, dynamically, responsive to at least one event 114. According to one embodiment, the processor device 102 may include at least one processing core (not shown) and at least one memory (not shown) having stored thereon a sequence of instructions which, when loaded and executed by the at least one processing core, causes the processor device 102 to implement the resource aligning unit 110. According to another embodiment, the processor device 102 may include one or more arrangements of circuitry, such as disclosed in U.S. application Ser. No. 12/769,463, filed Apr. 28, 2010, now U.S. Pat. No. 8,826,271, the entire teachings of which are incorporated herein by reference, and FIG. 6, disclosed below, or equivalents thereof, to implement the resource aligning unit 110.

The plurality of resources 106a-m may include processing cores, memories, caches, input/output (I/O) ports, I/O devices, hardware accelerators, operating systems, software applications, or any other suitable resources that may be utilized by a VSoC. Such resources may be internal or external to the processor device 102. The resource alignment 108 between the plurality of virtual systems on chip 104a-n and the plurality of resources 106a-m may partition the plurality of resources 106a-m such that some resources are shared and some are not shared amongst virtual systems on chip of the plurality of virtual systems on chip 104a-n. The resource alignment 108 may define which of the resources of the plurality of resources 106a-m are allocated for use by which virtual systems on chip of the plurality of virtual systems on chip 104a-n.

The resource aligning unit 110 may be further configured to modify the resource alignment 108, dynamically, to effectuate a throughput of the processor device 102 responsive to the at least one event 114. For example, the dynamic resource alignment 108 may be modified to add resources or remove resources to particular virtual systems on chip, as needed, in order to maintain a throughput requirement.

The at least one event may include an external event that transpires external to the processor device. For example, in a networking environment, the external event may be a Border Gateway Protocol (BGP) route flap. In the networking environment, the BGP route flap may indicate that less packets will need to be routed. As such, the resource alignment may be modified to remove resources from virtual systems on chip that support packet applications. The external event may be a notification of a virus attack. The notification of the virus attack may be an indication that more stringent inspection of packets is needed, increasing a computational workload for the processor device 102. The dynamic resource alignment 108 may be modified to, for example, allocate more resources, such as processing cores or other suitable resources, to a given VSoC that includes an application for packet inspection. The BGP route flap and notification of the virus attack are examples of external events; however, the external event may be any suitable event external to the processor device.

The at least one event may include a prescheduled event that is based on a time of day. The time of day may be a time during which the processor device may be understood to be heavily utilized (e.g., under heavy traffic load). Realigning, also referred to interchangeably herein as reassigning, the resources with the virtual systems on chip as a function of the time of day may proactively enable distribution of additional resources to those virtual systems on chip heavily utilized at the time of day. As such, the dynamic realignment may be modified, proactively, to prevent traffic discards and maintain a throughput requirement for the processor device.

The at least one event may include a failure event that indicates a malfunction of a given resource of the plurality of resources. Alignment between the malfunctioning resource and a VSoC may be modified such that the VSoC no longer accesses the malfunctioning resource and is, instead, aligned with another resource.

The at least one event may include an oversubscription event indicating that at least one resource of the plurality of resources is oversubscribed or indicating that at least one virtual system on chip of the plurality of virtual systems on chip is oversubscribed. Such oversubscription may be determined based on metrics. For example, QoS metrics that reflect traffic discards may be used to determine the oversubscription event. In response to the oversubscription event, a number of virtual systems on chip aligned with the at least one resource may be reduced by modifying the dynamic resource alignment. Further, a number of resources aligned with the at least one virtual system on chip may be increased by modifying the dynamic resource alignment.

The at least one event may include an idling event indicating that a given resource, of the plurality of resources, that is aligned to a given virtual system on chip, of the plurality of virtual systems on chip, has a usage percentage by the given virtual system that is below a threshold value. As such, the dynamic resource alignment may be modified to increase a number of virtual systems on chip sharing the given resource.

The resource alignment may be modified, dynamically, to prevent a loss in throughput otherwise effectuated by the at least one event. For example, based on historical metrics indicating traffic loss at a particular time of day, the dynamic resource alignment may be modified at the particular time of day to prevent future traffic loss from occurring at the particular time of day. As such, the at least one event may include a prescheduled event that is based on the time of day.

Figure 2:
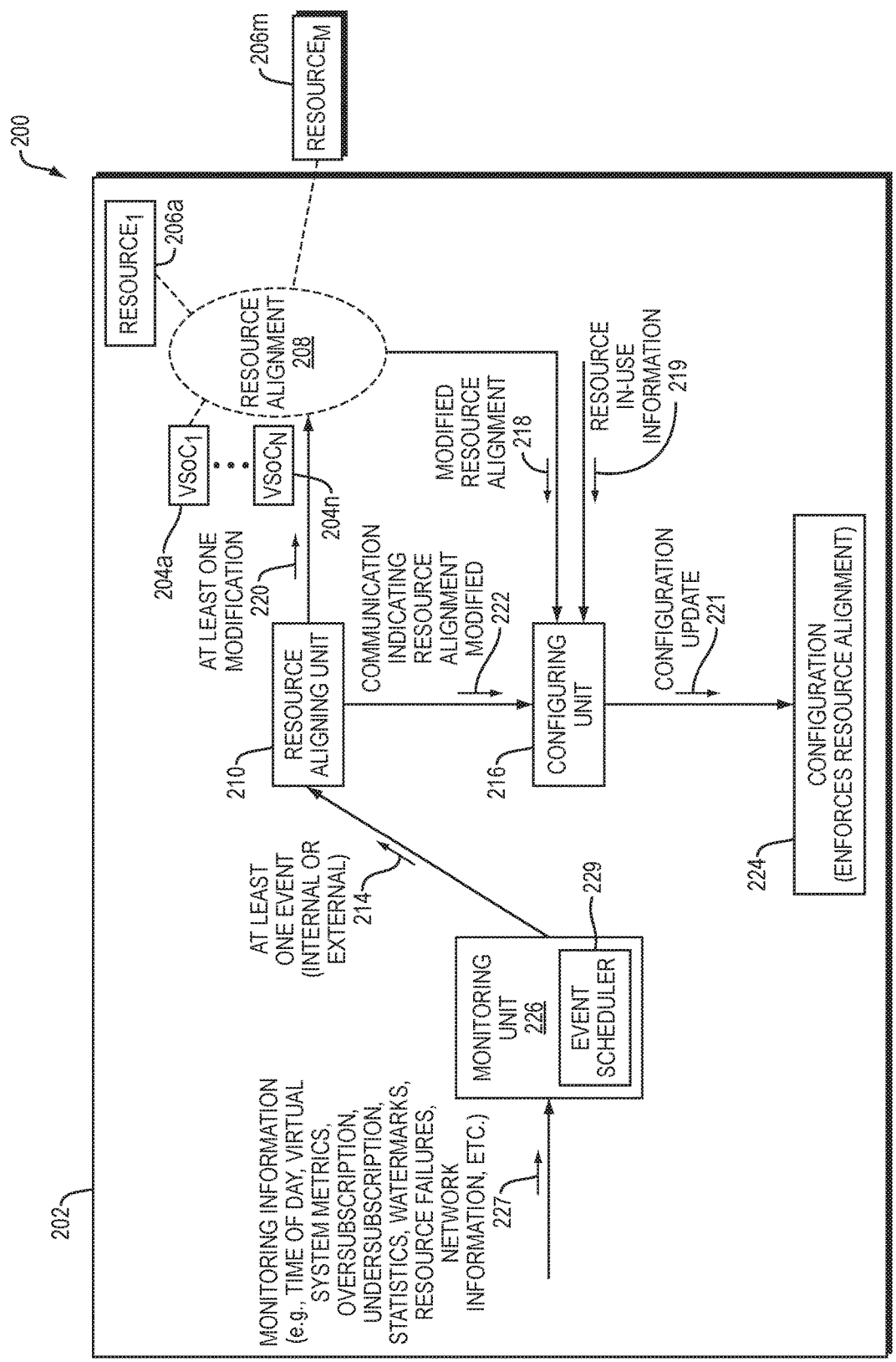
FIG. 2 is a block diagram of another example embodiment of a processor device.

FIG. 2 is a block diagram 200 of another example embodiment of a processor device 202. The processor device 202 comprises a plurality of virtual systems on chip 204a-n. The plurality of virtual systems on chip 204a-n may be configured to utilize resources of a plurality of resources 206a-m in accordance with a resource alignment 208 between the plurality of virtual systems on chip 204a-n and the plurality of resources 206a-m. The processor device 202 further comprises a resource aligning unit 210 that may be configured to modify the resource alignment 208, dynamically, responsive to at least one event 214.

The processor device 202 further comprises a configuring unit 216 operatively coupled to the resource aligning unit 210. The configuring unit 216 may be configured to apply the modified resource alignment 218, dynamically, responsive to at least one modification 220 to the resource alignment 208. The configuring unit 216 may be configured to detect that the resource aligning unit 210 has modified the resource alignment 208 by monitoring content of the resource alignment 208.

For example, the resource alignment 208 may be a data structure and the configuring unit 216 may be configured to monitor the content of the data structure for changes. According to some embodiments, an interrupt (not shown) may be asserted based on the at least one modification 220 to the resource alignment 208. Detecting the at least one modification 220 to the resource alignment 208 may be a function of the interrupt asserted; however, detecting the at least one modification 220 to the resource alignment 208 may be performed in any suitable manner.

For example, according to some embodiments, the configuring unit 216 may be configured to receive a communication 222 from the resource aligning unit 210 indicating that the resource aligning unit 210 modified the resource alignment 208. The communication 222 may be a communication message sent via a mailbox of the processor device 202, a semaphore that is released, or any other suitable communication mechanism.

To apply the modified resource alignment 218, dynamically, the configuring unit 216 may send a configuration update 221 to update a configuration 224 of the processor device 202 to enforce the plurality of virtual systems on chip 204a-n to utilize the plurality of resources 206a-m in accordance with the modified resource alignment 218. For example, the configuration 224 may include hardware register configuration settings (not shown) that enforce VSoC access permissions to the plurality of resources 206a-m. The configuration 224 may include any suitable configuration settings that enforce VSoC access permissions to the plurality of resources 206a-m. The configuration 224 may include provisioning information (not shown) for the processor device 202, wherein the provisioning information is a function of the resource alignment 208.

For example, the provisioning information may include configuration for a level two cache controller (not shown) of the processor device 202, wherein the level two cache controller controls memory accesses to memories included in the plurality of resources 206a-m. For example, all accesses with memories of the processor device may be routed to pass through a level two cache (not shown) controlled by the level two cache controller, as the level two cache may serve as a central location for memory accesses of the processor device 208.

The plurality of virtual systems on chip 204a-n may serve as virtualized execution environments for executing operating systems and embedded applications. The configuring unit 216 may update the configuration 224 to enforce that each VSoC accesses its corresponding resources in accordance with the resource alignment 208. Given the protection provided by the plurality of virtual systems on chip 204a-n, applications and operating systems running within each VSoC of the processor device 202 may not be aware of other applications and operating systems running inside other virtual systems on chip of the processor device 202.

The configuration 224 may enable or prevent VSoC access to a resource, or partitions thereof, as dictated by the resource alignment 208. For example, partitions of a resource, such as Dynamic Random Access Memory (DRAM), may be configured such that a partition may be accessed one by VSoC and not by other virtual systems on chip. The configuration 224 may enable a group of virtual systems on chip to share a given resource or portion thereof, and prevent other virtual systems on chip from accessing the given shared resource.

The configuration 224 may enforce VSoC priority for shared resources such that one VSoC may have strict or weighted priority for accessing the shared resource over other virtual systems on chip of the processor device. Such priority information (not shown) may be included as part of the configuration 224 or stored as part of the resource alignment 208.

The at least one modification 220 may include a modification to an alignment between a given virtual system on chip of the plurality of virtual systems on chip 204a-n and a given resource of the plurality of resources 206a-m. The configuring unit 216 may be further configured to apply the at least one modification 220 based on the given virtual system on chip relinquishing use of the given resource or based on expiration of a pre-determined time value applied thereto.

For example, although the at least one modification 220 may align (i.e., assign) the given resource with a virtual system on chip that is different from the given virtual system on chip, it may be that the given resource is still in use by the given virtual system on chip. The configuring unit 216 may determine that the given resource is still in use by the given virtual system on chip based on resource in-use information 219 that may accessed locally on the processor device 202. Such resource in-use information 219 may be updated by the plurality of virtual systems on chip 204a-n or may be updated in any other suitable way.

The configuring unit 216 may delay applying of the at least one modification 220 until the given virtual system on chip has relinquished its use of the given resource. Alternatively, the configuring unit 216 may employ a pre-determined time value to wait for the given virtual system on chip to relinquish its use of the given resource. The configuring unit 216 may apply the at least one modification 220 based on expiration of the pre-determined time value.

The processor device 202 may further comprise a monitoring unit 226 operatively coupled to the resource aligning unit 210. The monitoring unit 226 may be configured to monitor for at least one instance of the at least one event 214 and to communicate the at least one instance of the at least one event 214 to the resource aligning unit 210 to trigger the resource aligning unit 210 to modify the resource alignment 208, dynamically.

To monitor for the at least one instance of the at least one event 214, the at least one monitoring unit 226 may be further configured to monitor a state of at least one resource of the plurality of resources 206a-m or at least one virtual system state of the plurality of virtual systems on chip 204a-n. The state of the at least one resource of the plurality of resources 206a-m may include a failure state, a utilization state, or a combination thereof. The at least one state virtual system state of the plurality of virtual systems on chip 204a-n may include a failure state, a utilization state, or a combination thereof.

To monitor for the at least one instance of the at least one event 214, the monitoring unit 226 may monitor monitoring information 227 of the processor device 202. The monitoring information 227 may include information such as time of day, oversubscription metrics, idling metrics, resource watermarks, network information, resource failure information, etc. The monitoring information 227 may include any suitable information that may be monitored to determine the at least one event 214 for which dynamic modification of the resource alignment 208 in response thereto would be advantageous.

The monitoring unit 226 may include an event scheduler 229. The event scheduler 229 may schedule the at least one event 214 based on a realignment schedule (not shown). The realignment schedule may be a static schedule or a dynamic schedule that itself adjusts periodically. The realignment schedule may include one or more time of day entries. For example, the realignment scheduler may include one or more time of day entries for which realignment is advantageous with regard to performance of the processor device. The realignment schedule may be dynamically adjusted based on usage metrics for the entire processor device, per VSoC usage metrics, resource metrics, or any other suitable metrics. Realignment may be based on an external event, such as a BGP route flap, or any other suitable external event.

According to one embodiment, a resource may be a memory. The memory may include one or more chunks. Each of the one or more chunks may be a section of the memory including a corresponding fixed number of bits from the memory. The fixed number of bits may be contiguous. Alternatively, the one or more chunks may include a fixed number of bits from the memory that are scattered in the memory. The one or more chunks may each be freed or assigned to a given VSoC based on the at least one event. The at least one event may be a function of the realignment schedule, as such, the one or more chunks of the memory may be realigned, dynamically, on a scheduled basis. For example, since the at least one event may be a function of the realignment schedule, the one or more chunks of the memory may be freed, as scheduled, at times that the given VSoC is known to be, for example, under a light load, whereas the one or more chunks of the memory may be allocated to the given VSoC, as scheduled, at times that the given VSoC is known to be under a heavy load.

According to embodiments disclosed herein, the monitoring unit 226 may be configured to monitor various metrics to determine the failure, oversubscription, or idling events, disclosed above. For example, the monitoring unit 226 may be configured to monitor metrics such as parity or Error-Correcting Code (ECC) errors to determine a failure event. The monitoring unit 226 may apply thresholds to the parity or Error-Correcting Code (ECC) errors to determine the failure event. The failure event may be determined in any suitable way. For example, resources may have hardware failure or degradation type indicators that may be used for determining the failure event. Metrics, such as QoS statistics, may be monitored by the monitoring unit 226 to determine oversubscription or idling events. Modifying the resource alignment, dynamically, may be performed to enable a given virtual system on chip to meet a specific QoS requirement, such as a silver grade, or other suitable QoS grade.

According to one embodiment, the processor device 202 may include at least one processing core (not shown) and at least one memory (not shown) having stored thereon a sequence of instructions which, when loaded and executed by the at least one processing core, causes the processor device 202 to implement the resource aligning unit 210, the configuring unit 216, and the monitoring unit 226. According to another embodiment, the processor device 202 may include one or more arrangements of circuitry, such as disclosed in U.S. application Ser. No. 12/769,463, filed Apr. 28, 2010, now U.S. Pat. No. 8,826,271, the entire teachings of which are incorporated herein by reference, and FIG. 6, disclosed below, or equivalents thereof, to implement the resource aligning unit 210, the configuring unit 216, and the monitoring unit 226.

Figure 3:
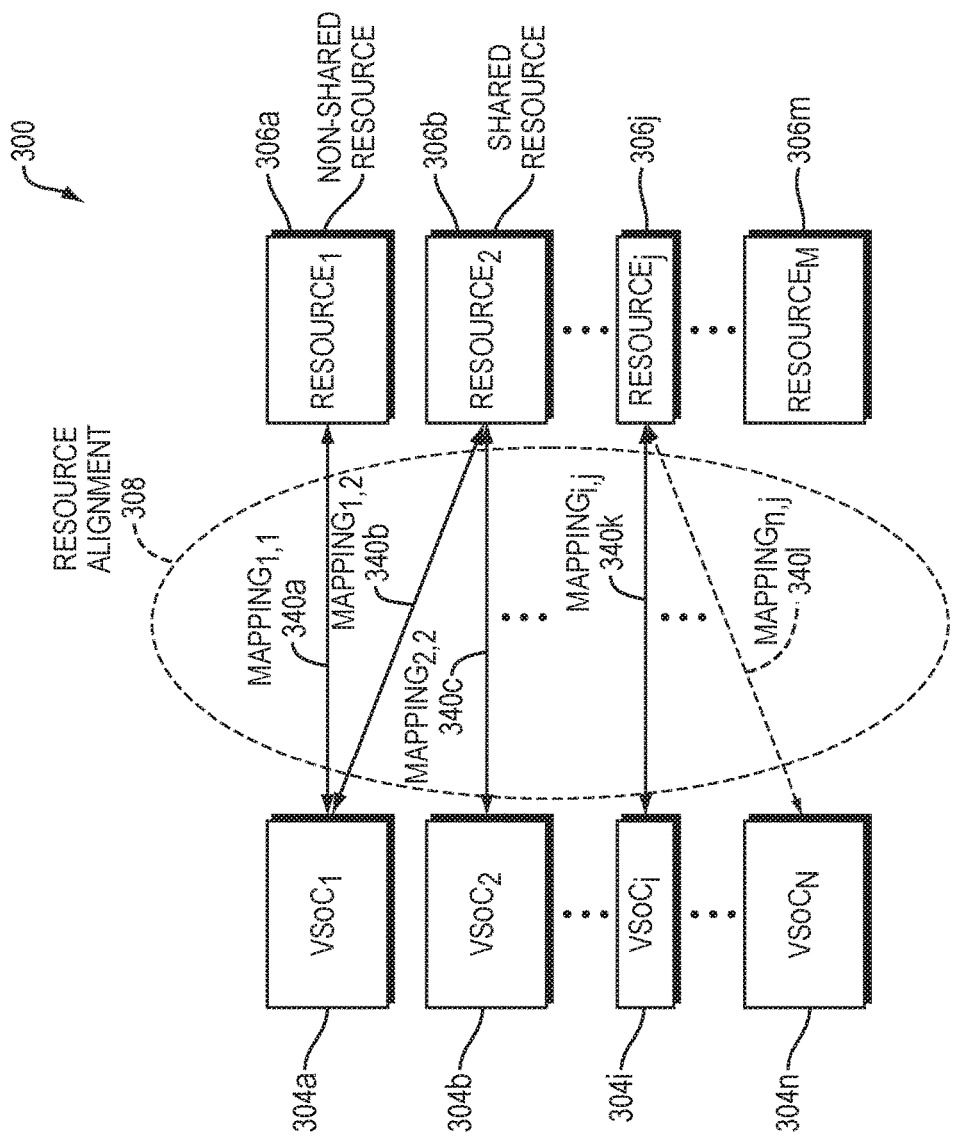
FIG. 3 is a block diagram of an example embodiment of a resource alignment.

FIG. 3 is a block diagram 300 of an example embodiment of a resource alignment 308. The resource alignment 308 may include a plurality of mappings 340a-k between the plurality of resources 306a-m and the plurality of virtual systems on chip 304a-n. To modify the resource alignment 308, dynamically, a resource aligning unit, such as the resource aligning unit 110 of FIG. 1 or the resource aligning unit 210 of FIG. 2, disclosed above, may be further configured to modify at least one mapping of the plurality of mappings 340a-k, dynamically, responsive to at least one event, such as the at least one event 114 of FIG. 1 or the at least one event 214 of FIG. 2, disclosed above.

The at least one mapping may align a given resource, of the plurality of resources 306a-m, with a given virtual system on chip, of the plurality of virtual systems on chip 304a-n. For example, mapping$_{1,1}$ 304a maps the VSoC$_1$ 304a with resource$_1$ 306a, mapping$_{1,2}$ 304b maps the VSoC$_1$ 304a with resource$_2$ 306b, mapping$_{2,2}$ 304c maps the VSoC$_2$ 304b with resource$_2$ 306b, and mapping$_{i,j}$ 304k maps the VSoC$_i$ 304i with resource$_j$ 306j.

Modifying the at least one mapping, dynamically, may include aligning the given resource with at least one other virtual system on chip of the plurality of virtual systems on chip 304a-n to preclude the given virtual system from employing the given resource and to enable the at least one other virtual system to employ the given resource. For example, modifying the at least one mapping may include removing the mapping$_{i,j}$ 304k and adding the mapping$_{n,j}$ 340l, precluding VSoC$_i$ 304i from using resource$_j$ 306j, and enabling VSoC$_n$ 304n to employ resource$_j$ 306j.

To modify the resource alignment 308, dynamically, the resource aligning unit, such as the resource aligning unit 110 of FIG. 1 or the resource aligning 210 unit of FIG. 2, disclosed above, may be further configured to add at least one mapping to the resource alignment 308, the at least one mapping aligning a resource, of the plurality of resources 306a-m, with a virtual system on chip, of the plurality of virtual systems on chip 304a-n. For example, adding the mapping$_{n,j}$ 340l may enable the VSoC$_n$ 304n to employ the resource$_j$ 306j.

The resource alignment 308 may include a plurality of mappings between the plurality of resources 306a-m and the plurality of virtual systems on chip 304a-n, such as the plurality of mappings 340a-k, and to modify the resource alignment 308, dynamically, may include removing at least one mapping from the plurality of mappings 340a-k, such as the mapping$_{i,j}$ 304k.

The resource alignment 308 may enable multiple virtual systems on chip, of the plurality of virtual systems on chip 304a-n, to share a given resource, of the plurality of resources 306a-m. For example, mapping$_{1,2}$ 340b and mapping$_{2,2}$ 340c of the resource alignment 308 enable the resource$_2$ 306b to be shared by VSoC$_1$ 304a and VSoC$_2$ 304b.

The multiple virtual systems on chip, of the plurality of virtual systems on chip 304a-n, may each be configured to use the given resource based on a respective usage percentage allocated to the respective virtual system for the given resource. The usage percentage may be a function of a type of the given resource, a type of application running on a respective virtual system on chip, or a combination thereof.

The usage percentage may be controlled by the corresponding virtual system on chip. The usage percentage may be monitored by an Virtual Machine Monitor (VMM) (not shown), also referred to interchangeably herein as a hypervisor, that may force the corresponding virtual system on chip to relinquish use of the given resource based on a watchdog.

The resource alignment 308 may enable a given virtual system on chip, of the plurality of virtual systems on chip, to use a given resource, exclusively. For example, resource$_1$ 306a may be a non-shared resource, such as an I/O port of a particular type, or any other suitable non-shared resource, and the mapping$_{1,1}$ 340a may enable the VSoC$_1$ 304n to use the resource$_1$ 306a, exclusively.

Figure 4:
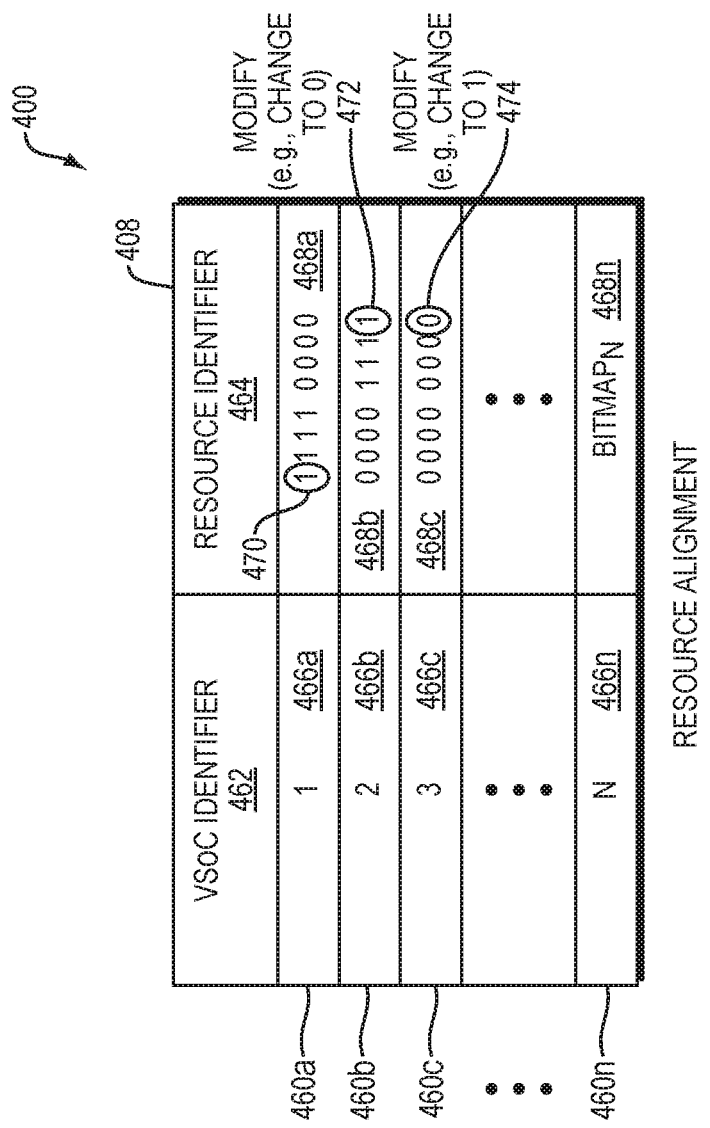
FIG. 4 is a block diagram of another example embodiment of a resource alignment.

FIG. 4 is a block diagram 400 of another example embodiment of a resource alignment 408. The resource alignment 408 may be a resource alignment table that includes a plurality of entries 460a-460n that each associate a unique virtual system on chip identifier 462 with a resource identifier 408. For example the plurality of entries 460a-460n may associate the unique virtual system on chip identifiers 466a-466n with the resource identifiers 468a-468n, respectively.

The unique virtual system on chip identifiers 466a-466n may each uniquely identify a virtual system on chip of a plurality of virtual systems on chip, such as the plurality of virtual systems on chip 104a-n, 204a-n, and 304a-n, of FIG. 1, FIG. 2, and FIG. 3, respectively, as disclosed above. The resource identifiers 468a-468n may indicate which of a plurality of resources, such as the plurality of resources 106a-106m, 206a-206m, and 306a-306m of FIG. 1, FIG. 2, and FIG. 3, respectively, may be utilized by the corresponding one or more virtual systems on chip identified by the unique virtual system on chip identifiers 466a-466n.

For example, the entry 460b of the resource alignment 408 may associate the virtual system identifier 466b with the resource identifier 468b. According to one embodiment, the resource identifiers 468a-468n may include bitmaps with each bit in the bitmap providing an alignment indicator for a corresponding resource; however, the resources identifiers may be implemented in any suitable way that aligns virtual systems on chip with resources. Each bit of the bitmap of the resource identifier may be referred to interchangeably herein as a resource alignment indicator.

Each bit of a bitmap of a resource identifier, such as the resource identifiers 468a-468n, associated with a virtual system on chip identifier, such as the virtual system on chip identifiers 460a-460n, that has a first state may map a respective resource associated with the bit to the VSoC that is associated with the virtual system on chip identifier, that is, the respective resource is aligned with the VSoC. Each bit of the bitmap that has a second state may reflect that no mapping exists between the respective resource and the VSoC that is associated with the virtual system on chip identifier, that is, the respective resource and the VSoC are not aligned. For example, bit 470 of the bitmap 468a, may be used to align the virtual system on chip, that is associated with the virtual system on chip identifier 466a, with the resource that is associated with a bit location of bit 470. The bit 470 that has a first state of "1" may align the virtual system on chip with the resource, enabling the virtual system on chip to use the resource, whereas the bit 470 with a second state of "0" may preclude the virtual system on chip from using the resource. A resource may be "moved" from one virtual system on chip to another by modifying a corresponding bit in the bitmaps.

For example, bit 472 and bit 474 of resources identifiers 468b and 468c, respectively, may each be associated with a particular resource. The particular resource may be associated with a bit location of bits 472 and 474. Modifying bit 472 by changing its value from "1" to "0" may change the resource alignment for the virtual system on chip associated with the virtual system on chip identifier 460b such that it can no longer access the particular resource. Modifying bit 474 by changing its value from "0" to "1" may change the resource alignment for the virtual system on chip associated with the virtual system on chip identifier 460c such that it is able to access the particular resource. As such, the particular resource has, in effect (i.e., not physically), been "moved" from one virtual system on chip to another.

Based on a resource type associated with the particular resource, embodiments disclosed herein may provide an atomic update to a resource alignment indicator of the resource alignment that corresponds to the particular resource. For example, modifying bits 472 and 474 of the respective resource identifiers 468b and 468c, as disclosed above, may include performing the modifications, atomically, such that modifications to values of the bits 472 and 474 are each made visible, concurrently, to the respective VSoCs associated with the resource identifiers 468b and 468c that include the bits 472 and 474. The atomic update may prevent a potential conflict between different VSoCs each requiring exclusive access to the particular resource.

According to embodiments disclosed herein, resource alignment indicators corresponding to a same resource that is associated with a non-shared resource type, such as a memory location or I/O port, or any other suitable type of resource that may be used in an exclusive manner, may be updated, atomically, whereas resource alignment indicators corresponding to a same resource that has a shared resource type, such as a processing core, or any other suitable shared resource type, may be modified on an individual basis. It should be understood that examples for shared and non-shared resource types do not limit the specific examples of types of resources to being shared or non-shared. For example, in some instances an I/O port may be a shared resource whereas a processing core may be a non-shared resource.

According to embodiments disclosed herein, a virtual system on chip identifier, such as the virtual system on chip identifier 462 may be determined based on extracting fields from a received packet (not shown). The extracted fields may be used to form a key, such as a 5-tuple key, that may be used to index into a Look-Up Table (LUT) (not shown) that maps keys to virtual system on chip identifiers. As such, the received packet may be scheduled to a given VSoC based on the virtual system on chip identifier 462 that is found in the LUT for the key. Using the virtual system on chip identifier 462 that is found in the LUT for the key, the corresponding resource identifier 464 may be identified for the given VSoC. The corresponding resource identifier 464 indicates which resources may be employed by the given VSoC, as disclosed above.

While the given VSoC is employing a particular resource for processing the received packet, at least one event may cause the resource alignment 408 to be modified such that the particular resource is no longer aligned with the given VSoC. As such, the configuring unit 216 may detect the modified resource alignment 218 and delay applying the configuration update 221, that would otherwise preclude the given VSoC from using the particular resource, until the particular resource is no longer in use by the given VSoC or a predetermined time value has expired.

Figure 5:
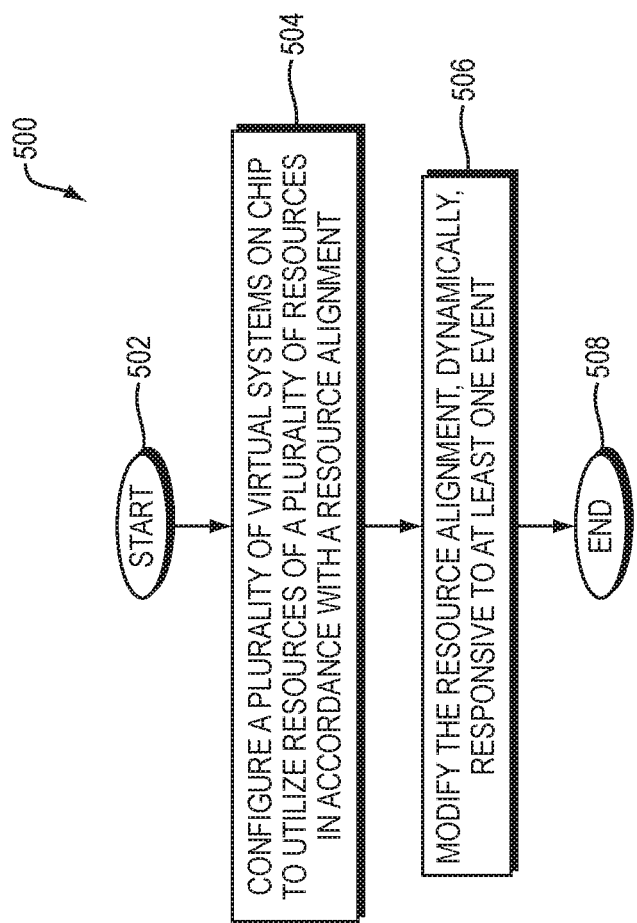
FIG. 5 is a flow diagram of an example embodiment of a method.

FIG. 5 is a flow diagram of an example embodiment of a method (500). The method may start (502) and configure a plurality of virtual systems on chip of a processor device to utilize resources of a plurality of resources in accordance with a resource alignment between the plurality of virtual systems on chip and the plurality of resources (504). The method may modify the resource alignment, dynamically, responsive to at least one event (508) and the method thereafter ends (508) in the example embodiment.

According to embodiments disclosed herein, a security appliance (not shown) may include the processor device 102 or 202. The processor device 102 or 202 may be a network services processor. The security appliance may be a stand-alone system that may switch packets received at one network interface to another network interface and may perform a plurality of security functions on received packets prior to forwarding the packets. For example, the security appliance may be used to perform security processing on packets that may be received on a Wide Area Network (WAN), or any other suitable network, prior to forwarding the processed packets to a Local Area Network (LAN), or any other suitable network.

The processor device 102 or 202 may be configured to process Open System Interconnection (OSI) network L2-L7 layer protocols encapsulated in received packets. As is well-known to those skilled in the art, the OSI reference model defines seven network protocol layers (L1-L7). The physical layer (L1) represents the actual interface, electrical and physical that connects a processor device to a transmission medium. The data link layer (L2) performs data framing. The network layer (L3) formats the data into packets. The transport layer (L4) handles end to end transport. The session layer (L5) manages communications between devices, for example, whether communication is half-duplex or full-duplex. The presentation layer (L6) manages data formatting and presentation, for example, syntax, control codes, special graphics and character sets. The application layer (L7) permits communications between users, for example, file transfer and electronic mail.

The processor device 102 or 202 may schedule and queue work (e.g., packet processing operations) for upper level network protocols, for example L4-L7, and enable processing of upper level network protocols in received packets to be performed to forward packets at wire-speed. By processing the protocols to forward the packets at wire-speed, the processor device 102 or 202 does not slow down the network data transfer rate. The processor device 102 or 202 may receive packets from network interfaces (not shown) that may be physical hardware interfaces, and may perform L2-L7 network protocol processing on the received packets. The processor devices 102 or 202 may subsequently forward processed packets through the network interfaces to another hop in the network, a final destination, or through another bus for further processing by a host processor. A plurality of virtual systems on chip, such as the plurality of virtual systems on chip 104*a-n*, or the plurality of virtual systems on chip 204*a-n*, may include applications for processing of network security protocols such as Firewall, Application Firewall, Virtual Private Network (VPN) including IP Security (IPSec) and/or Secure Sockets Layer (SSL), Intrusion Detection System (IDS), Anti-virus (AV), or any other suitable network protocol.

The plurality of virtual systems on chip 104*a-n* or 204*a-n* may deliver high application performance using a plurality of processing cores aligned with the plurality of virtual systems on chip 104*a-n* or 204*a-n*. Each of the processing cores may be dedicated to performing data plane, control plane operations, or a combination thereof A data plane operation may include packet operations for forwarding packets. A control plane operation may include processing of portions of complex higher level protocols such as Internet Protocol Security (IPSec), Transmission Control Protocol (TCP), Secure Sockets Layer (SSL), or any other suitable higher level protocol. The data plane operation may include processing of other portions of these complex higher level protocols.

According to embodiments disclosed herein, resources, such as the plurality of processing cores, memories, input/output ports, etc., may be dynamically assigned to one or more virtual systems on chip during runtime. Resource assignments may be dynamically realigned amongst multiple virtual systems on chip based on an at least one event, as disclosed above.

The plurality of processing cores may be assigned to virtual systems on chip that support data plane or control plane applications. Resources may be realigned amongst those virtual systems on chip assigned for data plane. For example, a first set of resources may be specified as available for data plane usage and dynamically assigned from one data plane VSoC to another data plane VSoC, such as a forwarding, IDS or AV type VSoC. Similarly, a second set of resources may be specified as available for control plane usage and the second set of resources may be dynamically assigned from one control plane VSoC to another control plane VSoC. According to embodiments disclosed herein, resources may be dynamically aligned with VSoCs.

Figure 6:
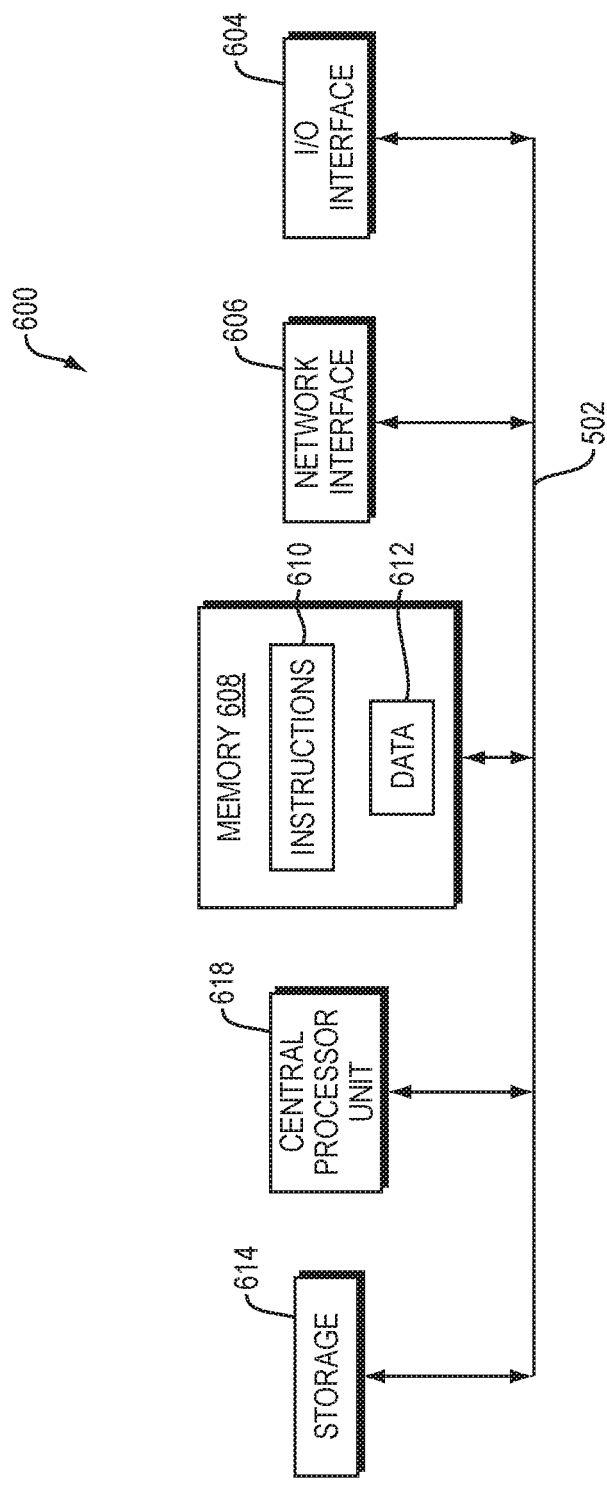
FIG. 6 is a block diagram of an example internal structure of a computer optionally within an embodiment disclosed herein.

FIG. 6 is a block diagram of an example of the internal structure of a computer 600 in which various embodiments of the present invention may be implemented. The computer 600 contains a system bus 602, where a bus is a set of hardware lines used for data transfer among the components of a computer or processing system. The system bus 602 is essentially a shared conduit that connects different elements of a computer system (e.g., processor, disk storage, memory, input/output ports, network ports, etc.) that enables the transfer of information between the elements. Coupled to the system bus 602 is an I/O device interface 604 for connecting various input and output devices (e.g., keyboard, mouse, displays, printers, speakers, etc.) to the computer 600. A network interface 606 allows the computer 600 to connect to various other devices attached to a network. Memory 608 provides volatile storage for computer software instructions 610 and data 612 that may be used to implement embodiments of the present invention. Disk storage 614 provides non-volatile storage for computer software instructions 610 and data 612 that may be used to implement embodiments of the present invention. A central processor unit 618 is also coupled to the system bus 602 and provides for the execution of computer instructions.

Further example embodiments disclosed herein may be configured using a computer program product; for example, controls may be programmed in software for implementing example embodiments. Further example embodiments may include a non-transitory computer-readable medium containing instructions that may be executed by a processor, and, when loaded and executed, cause the processor to complete methods described herein. It should be understood that elements of the block and flow diagrams, such as the resource aligning unit 110 or 210, configuring unit 216, and monitoring unit 226, or any other elements of the block and flow diagrams disclosed herein, may be implemented in software, hardware, such as via one or more arrangements of circuitry disclosed in U.S. application Ser. No. 12/769,463, filed Apr. 28, 2010, now U.S. Pat. No. 8,826,271, the entire teachings of which are incorporated herein by reference, and FIG. 6, disclosed above, or equivalents thereof, firmware, a combination thereof, or other similar implementation determined in the future. In addition, the elements of the block and flow diagrams described herein may be combined or divided in any manner in software, hardware, or firmware. If implemented in software, the software may be written in any language that can support the example embodiments disclosed herein. The software may be stored in any form of computer readable medium, such as random access memory (RAM), read only memory (ROM), compact disk read-only memory (CD-ROM), and so forth. In operation, a general purpose or application-specific processor or processing core loads and executes software in a manner well understood in the art. It should be understood further that the block and flow diagrams may include more or fewer elements, be arranged or oriented differently, or be represented differently. It should be understood that implementation may dictate the block, flow, and/or network diagrams and the number of block and flow diagrams illustrating the execution of embodiments disclosed herein.

While this invention has been particularly shown and described with references to example embodiments thereof, it will be understood by those skilled in the art that various changes in form and details may be made therein without departing from the scope of the invention encompassed by the appended claims.

What is claimed is:

1. A processor device comprising:
a plurality of virtual systems on chip configured to utilize resources of a plurality of resources in accordance with a resource alignment between the plurality of virtual systems on chip and the plurality of resources; and
a resource aligning unit configured to modify the resource alignment, dynamically, responsive to at least one event, the at least one event including an external event that transpires external to the processor device;
wherein, in an event the external event includes a notification that indicates a need for more stringent packet inspection, the resource aligning unit is configured to modify the resource alignment by allocating more resources to a given virtual system on chip, of the plurality of virtual systems on chip, that includes an application for packet inspection, and
wherein, in an event the external event includes a route flap, the resource aligning unit is configured to modify the resource alignment by removing resources from virtual systems on chip, of the plurality of virtual systems on chip, that support packet applications.

2. The processor device of claim 1, wherein the resource aligning unit is further configured to modify the resource alignment, dynamically, to effectuate a throughput of the processor device responsive to the at least one event.

3. The processor device of claim 1, further comprising a configuring unit operatively coupled to the resource aligning unit and configured to apply the modified resource alignment, dynamically, responsive to at least one modification to the resource alignment.

4. The processor device of claim 3, wherein the configuring unit is further configured to detect that the resource aligning unit modified the resource alignment.

5. The processor device of claim 3, wherein the configuring unit is further configured to receive a communication from the resource aligning unit indicating that the resource aligning unit modified the resource alignment.

6. The processor device of claim 3, wherein to apply the modified resource alignment, dynamically, the configuring unit is further configured to update a configuration of the processor device to enforce the plurality of virtual systems on chip to utilize the resources in accordance with the modified resource alignment.

7. The processor device of claim 3, wherein the at least one modification includes a modification to an alignment between a given virtual system on chip of the plurality of virtual systems on chip and a given resource of the plurality of resources, and wherein the configuring unit is further configured to apply the at least one modification based on the given virtual system on chip relinquishing use of the given resource or based on expiration of a pre-determined time value applied thereto.

8. The processor device of claim 1, further comprising a monitoring unit operatively coupled to the resource aligning unit, the monitoring unit configured to monitor for at least one instance of the at least one event and to communicate the at least one instance of the at least one event to the resource aligning unit to trigger the resource aligning unit to modify the resource alignment, dynamically.

9. The processor device of claim 8, wherein to monitor for the at least one instance of the at least one event, the at least one monitoring unit is further configured to monitor a state of at least one resource of the plurality of resources or at least one virtual system state of the plurality of virtual systems on chip.

10. The processor device of claim 9, wherein the state of the at least one resource of the plurality of resources includes a failure state, a utilization state, or a combination thereof.

11. The processor device of claim 9, wherein the at least one virtual system state of the plurality of virtual systems on chip includes a failure state, a utilization state, or a combination thereof.

12. The processor device of claim 1, wherein: the resource alignment includes a plurality of mappings between the plurality of resources and the plurality of virtual systems on chip; and to modify the resource alignment, dynamically, the resource aligning unit is further configured to modify at least one mapping of the plurality of mappings, dynamically, responsive to the at least one event.

13. The processor device of claim 12, wherein: the at least one mapping aligns a given resource, of the plurality of resources, with a given virtual system on chip, of the plurality of virtual systems on chip; and modifying the at least one mapping, dynamically, includes aligning the given resource with at least one other virtual system on chip of the plurality of virtual systems on chip to preclude the given virtual system on chip from employing the given resource and to enable the at least one other virtual system on chip to employ the given resource.

14. The processor device of claim 1, wherein to modify the resource alignment, dynamically, the resource aligning unit is further configured to add at least one mapping to the resource alignment, the at least one mapping aligning a resource, of the plurality of resources, with a virtual system on chip, of the plurality of virtual systems on chip.

15. The processor device of claim 1, wherein: the resource alignment includes a plurality of mappings between the plurality of resources and the plurality of virtual systems on chip; and to modify the resource alignment, dynamically, includes removing at least one mapping from the plurality of mappings.

16. The processor device of claim 1, wherein the resource alignment enables multiple virtual systems on chip, of the plurality of virtual systems on chip, to share a given resource, of the plurality of resources.

17. The processor device of claim 16, wherein the multiple virtual systems on chip, of the plurality of virtual systems on chip, are each configured to use the given resource based on a respective usage percentage allocated to the respective virtual system on chip for the given resource.

18. The processor device of claim 1, wherein the resource alignment enables a given virtual system on chip, of the plurality of virtual systems on chip, to use a given resource, exclusively.

19. The processor device of claim 1, wherein the at least one event includes a prescheduled event that is based on a time of day.

20. The processor device of claim 1, wherein the at least one event includes a failure event that indicates a malfunction of a given resource of the plurality of resources.

21. The processor device of claim 1, wherein the at least one event includes an oversubscription event indicating that at least one resource of the plurality of resources is oversubscribed or indicating that at least one virtual system on chip of the plurality of virtual systems on chip is oversubscribed.

22. The processor device of claim 1, wherein the at least one event includes an idling event indicating that a given resource, of the plurality of resources, that is aligned to a given virtual system on chip, of the plurality of virtual systems on chip, has a usage percentage by the given virtual system on chip that is below a threshold value.

23. The processor device of claim 1, wherein the resource alignment is modified, dynamically, to prevent a loss in throughput otherwise effectuated by the at least one event.

24. A method comprising:
configuring a plurality of virtual systems on chip of a processor device to utilize resources of a plurality of resources in accordance with a resource alignment between the plurality of virtual systems on chip and the plurality of resources; and
modifying the resource alignment, dynamically, responsive to at least one event, the at least one event including an external event that transpires external to the processor device;
wherein, in an event the external event includes a notification that indicates a need for more stringent packet inspection, modifying the resource alignment includes allocating more resources to a given virtual system on chip, of the plurality of virtual systems on chip, that includes an application for packet inspection, and
wherein, in an event the external event includes a route flap, modifying the resource alignment includes removing resources from virtual systems on chip, of the plurality of virtual systems on chip, that support packet applications.

25. The method of claim 24, wherein modifying the resource alignment, dynamically, responsive to the at least one event, effectuates a throughput of the processor device responsive to the at least one event.

26. The method of claim 24, further comprising applying the modified resource alignment, dynamically, responsive to at least one modification to the resource alignment.

27. The method of claim 26, further comprising detecting the at least one modification to the resource alignment.

28. The method of claim 26, further comprising receiving a communication of the at least one modification to the resource alignment.

29. The method of claim 26, further comprising updating a configuration of the processor device to enforce the plurality of virtual systems on chip to utilize the resources in accordance with the modified resource alignment.

30. The method of claim 26, wherein the at least one modification includes a modification to an alignment between a given virtual system on chip of the plurality of virtual systems on chip and a given resource of the plurality of resources, and wherein applying the at least one modification is based on the given virtual system on chip relinquishing use of the given resource or based on expiration of a pre-determined time value applied thereto.

31. The method of claim 24, further comprising monitoring for at least one instance of the at least one event and communicating the at least one instance of the at least one event to trigger dynamic modification of the resource alignment.

32. The method of claim 31, wherein monitoring includes monitoring a state of at least one resource of the plurality of resources or at least one virtual system on chip state of the plurality of virtual systems on chip.

33. The method of claim 32, wherein the state of the at least one resource of the plurality of resources includes a failure state, a utilization state, or a combination thereof.

34. The method of claim 32, wherein the at least one virtual system state of the plurality of virtual systems on chip includes a failure state, a utilization state, or a combination thereof.

35. The method of claim 24, wherein: the resource alignment includes a plurality of mappings between the plurality of resources and the plurality of virtual systems on chip; and modifying the resource alignment, dynamically, includes modifying at least one mapping of the plurality of mappings, dynamically, responsive to the at least one event.

36. The method of claim 35, wherein: the at least one mapping aligns a given resource, of the plurality of resources, with a given virtual system on chip, of the plurality of virtual systems on chip; and modifying the at least one mapping, dynamically, includes aligning the given resource with at least one other virtual system on chip of the plurality of virtual systems on chip to preclude the given virtual system on chip from employing the given resource and to enable the at least one other virtual system on chip to employ the given resource.

37. The method of claim 24, wherein to modifying the resource alignment, dynamically, includes adding at least one mapping to the resource alignment, the at least one mapping aligning a resource, of the plurality of resources, with a virtual system on chip, of the plurality of virtual systems on chip.

38. The method of claim 24, wherein: the resource alignment includes a plurality of mappings between the plurality of resources and the plurality of virtual systems on chip; and modifying the resource alignment, dynamically, includes removing at least one mapping from the plurality of mappings.

39. The method of claim 24, further comprising enabling multiple virtual systems on chip, of the plurality of virtual systems on chip, to share a given resource, of the plurality of resources based on the resource alignment.

40. The method of claim 39, wherein enable the multiple virtual systems on chip includes configuring the multiple virtual systems on chip to use the given resource based on a respective usage percentage allocated to the respective virtual system on chip for the given resource.

41. The method of claim 24, further comprising enabling a given virtual system on chip, of the plurality of virtual systems on chip, to use a given resource, exclusively, based on the resource alignment.

42. The method of claim 24, wherein the at least one event includes a prescheduled event that is based on a time of day.

43. The method of claim 24, wherein the at least one event includes a failure event that indicates a malfunction of a given resource of the plurality of resources.

44. The method of claim 24, wherein the at least one event includes an oversubscription event indicating that at least one resource of the plurality of resources is oversubscribed or indicating that at least one virtual system on chip of the plurality of virtual systems on chip is oversubscribed.

45. The method of claim 24, wherein the at least one event includes an idling event indicating that a given resource, of the plurality of resources, that is aligned to a given virtual system on chip, of the plurality of virtual systems on chip, has a usage percentage by the given virtual system on chip that is below a threshold value.

46. The method of claim 24, wherein modifying the resource alignment, dynamically, prevents a loss in throughput otherwise effectuated by the at least one event.

47. A non-transitory computer-readable medium having encoded thereon a sequence of instructions which, when loaded and executed by a processor device, causes the processor device to:
configure a plurality of virtual systems on chip of the processor device to utilize resources of a plurality of resources in accordance with a resource alignment between the plurality of virtual systems on chip and the plurality of resources; and
modify the resource alignment, dynamically, responsive to at least one event, the at least one event including a routing an external event that transpires external to the processor device;
wherein, in an event the external event includes a notification that indicates a need for more stringent packet inspection, the processor device is caused to modify the resource alignment by allocating more resources to a given virtual system on chip, of the plurality of virtual systems on chip, that includes an application for packet inspection, and
wherein, in an event the external event includes a route flap, the processor device is caused to modify the resource alignment by removing resources from virtual systems on chip, of the plurality of virtual systems on chip, that support packet applications.

48. The non-transitory computer-readable medium of claim 47, wherein modifying the resource alignment, dynamically, responsive to the at least one event, effectuates a throughput of the processor device responsive to the at least one event.

49. The non-transitory computer-readable medium of claim 47, wherein the sequence of instructions further causes the processor device to apply the modified resource alignment, dynamically, responsive to at least one modification to the resource alignment.

50. The non-transitory computer-readable medium of claim 49, wherein the sequence of instructions further causes the processor device to detect the at least one modification to the resource alignment.

51. The non-transitory computer-readable medium of claim 49, wherein the sequence of instructions further causes the processor device to receive a communication of the at least one modification to the resource alignment.

52. The non-transitory computer-readable medium of claim 49, wherein the sequence of instructions further causes the processor device to update a configuration of the processor device to enforce the plurality of virtual systems on chip to utilize the resources in accordance with the modified resource alignment.

53. The non-transitory computer-readable medium of claim 49, wherein the at least one modification includes a modification to an alignment between a given virtual system on chip of the plurality of virtual systems on chip and a given resource of the plurality of resources, and wherein applying the at least one modification is based on the given virtual system on chip relinquishing use of the given resource or based on expiration of a pre-determined time value applied thereto.

54. The non-transitory computer-readable medium of claim 47, wherein the sequence of instructions further causes the processor device to monitor for at least one instance of the at least one event and communicate the at least one instance of the at least one event to trigger dynamic modification of the resource alignment.

55. The non-transitory computer-readable medium of claim 54, wherein the sequence of instructions further causes the processor device to monitor a state of at least one resource of the plurality of resources or at least one virtual system on chip state of the plurality of virtual systems on chip.

56. The non-transitory computer-readable medium of claim 55, wherein the state of the at least one resource of the plurality of resources includes a failure state, a utilization state, or a combination thereof.

57. The non-transitory computer-readable medium of claim 55, wherein the virtual system state of the plurality of virtual systems on chip includes a failure state, a utilization state, or a combination thereof.

58. The non-transitory computer-readable medium of claim 47, wherein: the resource alignment includes a plurality of mappings between the plurality of resources and the plurality of virtual systems on chip; and wherein the sequence of instructions further causes the processor device to modify at least one mapping of the plurality of mappings, dynamically, responsive to the at least one event.

59. The non-transitory computer-readable medium of claim 58, wherein: the at least one mapping aligns a given resource, of the plurality of resources, with a given virtual system on chip, of the plurality of virtual systems on chip; and wherein the sequence of instructions further causes the processor device to align the given resource with at least one other virtual system on chip of the plurality of virtual systems on chip to preclude the given virtual system on chip from employing the given resource and to enable the at least one other virtual system on chip to employ the given resource.

60. The non-transitory computer-readable medium of claim 47, wherein the sequence of instructions further causes the processor device to add at least one mapping to the resource alignment, the at least one mapping aligning a resource, of the plurality of resources, with a virtual system on chip, of the plurality of virtual systems on chip.

61. The non-transitory computer-readable medium of claim 47, wherein: the resource alignment includes a plurality of mappings between the plurality of resources and the plurality of virtual systems on chip; and wherein the sequence of instructions further causes the processor device to remove at least one mapping from the plurality of mappings.

62. The non-transitory computer-readable medium of claim 47, wherein the sequence of instructions further causes the processor device to enable multiple virtual systems on chip, of the plurality of virtual systems on chip, to share a given resource, of the plurality of resources based on the resource alignment.

63. The non-transitory computer-readable medium of claim 62, wherein the sequence of instructions further causes the processor device to enable the multiple virtual systems on chip, of the plurality of virtual systems on chip, to use the given resource based on a respective usage percentage allocated to the respective virtual system on chip for the given resource.

64. The non-transitory computer-readable medium of claim 47, wherein the sequence of instructions further causes the processor device to enable a given virtual system on chip, of the plurality of virtual systems on chip, to use a given resource, exclusively, based on the resource alignment.

65. The non-transitory computer-readable medium of claim 47, wherein the at least one event includes a prescheduled event that is based on a time of day.

66. The non-transitory computer-readable medium of claim 47, wherein the at least one event includes a failure event that indicates a malfunction of a given resource of the plurality of resources.

67. The non-transitory computer-readable medium of claim 47, wherein the at least one event includes an oversubscription event indicating that at least one resource of the plurality of resources is oversubscribed or indicating that at least one virtual system on chip of the plurality of virtual systems on chip is oversubscribed.

68. The non-transitory computer-readable medium of claim 47, wherein the at least one event includes an idling event indicating that a given resource, of the plurality of resources, that is aligned to a given virtual system on chip, of the plurality of virtual systems on chip, has a usage percentage by the given virtual system on chip that is below a threshold value.

69. The non-transitory computer-readable medium of claim 47, wherein by modifying the resource alignment, dynamically, prevents a loss in throughput otherwise effectuated by the at least one event.

* * * * *

UNITED STATES PATENT AND TRADEMARK OFFICE
CERTIFICATE OF CORRECTION

PATENT NO. : 10,235,211 B2  
APPLICATION NO. : 15/136330  
DATED : March 19, 2019  
INVENTOR(S) : Rajan Goyal, Muhammad Raghib Hussain and Richard E. Kessler Page 1 of 1

It is certified that error appears in the above-identified patent and that said Letters Patent is hereby corrected as shown below:

In the Specification

Column 13, Line 48, delete "event (508)" and insert -- event (506) --

In the Claims

Claim 40, Column 19, Line 31, delete "wherein enable" and insert -- wherein enabling --

Claim 47, Column 20, Lines 2-3, delete "a routing"

Signed and Sealed this  
Twenty-first Day of May, 2019

Andrei Iancu  
*Director of the United States Patent and Trademark Office*